(12) United States Patent
Fischer et al.

(10) Patent No.: US 7,331,431 B2
(45) Date of Patent: Feb. 19, 2008

(54) PNEUMATICALLY OR ELECTROMOTIVELY OPERABLE DISC BRAKE

(75) Inventors: Rudolf Fischer, Erding (DE); Dietmar Knoop, Ebenhausen (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/282,589

(22) Filed: Nov. 21, 2005

(65) Prior Publication Data
US 2006/0118369 A1   Jun. 8, 2006

Related U.S. Application Data

(63) Continuation of application No. PCT/EP2004/005326, filed on May 18, 2004.

(30) Foreign Application Priority Data
May 19, 2003 (DE) ................. 103 22 834

(51) Int. Cl.
*F16D 55/02* (2006.01)
(52) U.S. Cl. ................. 188/71.9; 188/196 D; 188/72.1
(58) Field of Classification Search ......... 188/218 XL, 188/71.9, 71.8, 71.7, 73.38, 73.36, 72.1, 188/72.8, 218 A, 196 D, 369
See application file for complete search history.

(56) References Cited

U.S. PATENT DOCUMENTS

| | | | |
|---|---|---|---|
| 3,633,712 A * | 1/1972 | Farr | 188/71.9 |
| 3,878,923 A | 4/1975 | Farr | |
| 3,900,085 A * | 8/1975 | Harrison | 188/196 D |
| 4,056,173 A | 11/1977 | Farr | |
| 4,598,800 A * | 7/1986 | Marianu | 188/71.9 |
| 5,568,845 A * | 10/1996 | Baumgartner et al. | 188/71.9 |
| 5,722,273 A * | 3/1998 | Lin et al. | 70/370 |
| 6,336,686 B2 * | 1/2002 | Thomas et al. | 303/2 |
| 6,435,319 B1 * | 8/2002 | Thomas et al. | 188/72.1 |
| 6,685,230 B1 * | 2/2004 | Bottura | 285/39 |

FOREIGN PATENT DOCUMENTS

| | | |
|---|---|---|
| DE | 94 22 342 U1 | 4/2000 |
| DE | 102 53 642 A1 | 6/2004 |

OTHER PUBLICATIONS

International Search Report dated Sep. 1, 2004.

* cited by examiner

*Primary Examiner*—Robert A. Siconolfi
*Assistant Examiner*—Mariano Sy
(74) *Attorney, Agent, or Firm*—Crowell & Moring LLP

(57) ABSTRACT

A pneumatically or electromotively operable disc brake, including a brake caliper that straddles a brake disc, at least one brake application device for tensioning the brake disc by way of a displaceably guided element, particularly a cross member. The displaceably guided element has at least one threaded borehole into which an adjusting spindle is screwed. This adjusting spindle supports a pressing piece by which a brake pad can be pressed against the brake disc. A wear adjusting device is provided for resetting the clearance and is actively connected to the adjusting spindle. A securing element acts upon the adjusting spindle, thus preventing turning up to a specified torque. The securing element is provided in the form of a spring clip with at least one or more spring saddles, which are distributed over the periphery and which rest in a frictional contact against the adjusting spindle outside the internal thread of the displaceably guided element.

26 Claims, 6 Drawing Sheets

PNEUMATICALLY OR ELECTROMOTIVELY OPERABLE DISC BRAKE

CROSS-REFERENCE TO RELATED APPLICATIONS

The application is a continuation of PCT Application No. PCT/EP2004/005326 filed on May 18, 2004 which claims priority to German Application 103 22 834.9 filed May 19, 2003.

BACKGROUND AND SUMMARY OF THE INVENTION

The present invention relates to a pneumatically or electromotively operable disc brake, having a brake caliper, which reaches around a brake disc, at least one brake application device for applying the disc brake by way of a displaceably guided element, in particular a crossmember. The displaceably guided element has at least one threaded hole, into which an adjusting spindle is screwed which bears a pressure piece, with which it is possible to press a brake lining against the brake disc. An adjusting device, which is operatively connected to the adjusting spindle for adjusting the clearance play, and a securing element, which acts on the adjusting spindle so as to impede rotation up to a defined torque, are also provided In a disc brake of this type, as is known, for example, from DE 94 22 342 U1, a rotary lever acts on a crossmember (also known as a bridge or transverse member), in which preferably two adjusting spindles are mounted, which each have a pressure piece for accommodating a brake lining which is pressed against a brake disc during braking operations. The two adjusting spindles are provided with an external thread and are screwed, in each case, into a threaded hole of the crossmember.

By using an adjusting device which is assigned to one of the adjusting spindles, and by use of a driver of the other adjusting spindle, the brake pad is applied by rotation of the adjusting spindles in the threaded holes in the event of wear of the brake lining to such an extent that the play (or gap) between the brake lining and the brake disc always remains substantially constant.

In order to prevent that, as a result of vibrations during driving operation, the adjusting spindles change their position undesirably, and thus the distance between the brake lining and the disc brake, that is to say the play, securing elements are used. The securing elements act on the adjusting spindles so as to impede rotation, with the result that the above-mentioned unintended displacement is prevented. Here, the securing elements are in frictional contact with the adjusting spindle or parts of the latter. The frictional force is dimensioned such that the rotation of the adjusting spindles is possible without problems in the event of a defined torque which is to be applied by the adjusting device, said torque being greater than that which can result from the vibration forces during driving operation.

Similar problems occur in the case of purely static intermittent operation of the brake as a result of tumbling of the adjuster drive with respect to the adjusting members (threaded tubes or adjusting spindles), specifically if a can also be adjusted so as to be constant as far as possible over time and loading. Precisely this is possible only to a limited extent in the prior art.

A known securing element therefore comprises a (secondary) seal, which is arranged in an end region of the adjusting spindle that faces the pressure piece, and which engages into the adjusting spindles in a securing manner.

Inter alia for the function of impeding rotation, the secondary seal or the part which engages into the adjusting spindle is composed of an elastomer such as silicone rubber, which is integrated into the secondary seal.

In particular during heavy usage, the adjusting spindles reach temperatures which a plastic securing element cannot resist in the long term.

Embrittlement and aging of the material and reactions to the unavoidable action of grease also limit the service life, with the result that wear-induced replacement is necessary at intervals which make little economic sense.

Although solutions are known in which metallic rings or tongues, which are inserted into the crossmember, come into engagement with the adjusting spindles, this construction can in general be realized only with special mechanical machining of the crossmember, which naturally has the consequence of an increase in the manufacturing costs.

The present invention is therefore based on the object of developing a disc brake of the above-mentioned type such that a long service life of the securing elements is attained with structurally simple means. It also is intended mechanical machining of the crossmember, which naturally has the consequence of an increase in the manufacturing costs.

The present invention is therefore based on the object of developing a disc brake of the above-mentioned type such that a long service life of the securing elements is attained with structurally simple means. It also is intended to be possible to realize fixing of the limiting torque, up to which the securing elements prevent undesirable rotations of the adjusting spindles, which fixing is as precise as possible and is constant over the service life.

This object is achieved by a disc brake wherein the securing element is configured as a spring ring having at least one or more spring clips, which are distributed over the circumference and are in frictional contact with the adjusting spindle outside the internal thread of the displaceably guided element, in particular of the crossmember.

One particular advantage consists in that it is possible for the limiting torque to be defined exactly, which limiting torque is in addition very constant over the long term and up to which rotations of the adjusting spindle or spindles are prevented.

The structural configuration selected also results in a long list of advantages, both with regard to the operation of the disc brake and also with regard to the manufacture of the securing elements and with regard to their mounting.

In particular, the capability of easy retrofitting to existing disc brakes is to be mentioned.

In order to define the limiting torque up to which rotations of the adjusting spindle or spindles are prevented, it is possible, in particular, to vary the type and number of spring clips. At least one spring clip is preferably provided. However, an arrangement having three or more, in particular five or six, spring clips is more advantageous, as the spring clips may firstly still be arranged satisfactorily on the ring element and secondly ensure a uniform force action on the adjusting spindle or spindles from a plurality of points.

In addition to the friction surface which may be selected with regard to its dimensions, it is also possible to define the rotational impeding by defining the spring force, the spring force resulting from the restoring force of the individual spring clips and their number.

The spring ring, preferably composed of spring steel, may be manufactured from a simple, stripshaped punched part, which is to be shaped with low complexity by being bent to form a circular ring. Here, the two ends are preferably configured (for example, in the manner of a lock) in such a way that they engage into one another in a form-fitting manner when plugged together.

It is likewise not necessary to machine the crossmember, as the spring ring is arranged outside the internal thread of the crossmember in the region of the secondary seal, that is to say on the side which faces the pressure piece, and its spring clips, which are preferably configured as spring arms, are in frictional contact there with the adjusting spindle.

In an advantageous manner, the available installation space may thus be utilized for the insertion of the spring ring; it is to be emphasized as a particular advantage that the spring ring may also be installed without problems as a replacement into existing disc brakes, that is to say brakes which are already in operation. Here, the available assembly tools can be used for retrofitting or replacement. The simple assembly with the equally unproblematic attachment to the brake likewise leads to a reduction in costs, such as the ability to be manufactured using known technologies.

The spring ring which is, as has been mentioned, preferably metallic may be subjected to high temperatures compared with a spring ring made from plastic, with the result that the operating temperatures which occur do not have any effects on the service life of the component. A contribution is also made by the fact that a spring ring of this type is extremely robust mechanically, that is to say it is not sensitive to the loading which occurs, as a result of which a long service life is attained. It is possible here to manufacture the spring ring from stainless spring steel.

It is also contemplated to design the spring ring in an integrated manner with a seal. Here, it is also possible for the spring ring to be surrounded completely or partially by injection-molded and/or foamed encapsulation. Here, the spring clips are preferably left free from the foamed encapsulation. It is possible in this way to manufacture, for example, a secondary seal, for example so as to complement a folding bellows as a primary seal, which protects the interior of the brake caliper against ingress of moisture.

The spring arms may be shaped differently, for example U-shaped in their free end region, the open side pointing outward, that is to say away from the adjusting spindle. Shaping of this type affords particular advantages during assembly, that is to say when the spring ring is pushed onto the adjusting spindle (retrofitting), or during the assembly of the threaded spindle on a conveyor belt if the spring ring is already situated on the crossmember (original equipment).

The width of the spring clips, in particular in the region of contact with the adjusting spindle, is dimensioned such that the spring clips bear against a plurality of crests of the threads.

As an alternative to a slotted ring, which can be manufactured very easily, the spring ring may also, in principle, be of a closed configuration.

In summary, the following advantages result from the securing element of the present invention, in particular:
 it can be subjected to high temperatures
 it is mechanically robust;
 it is elastically deformable;
 it is suitable for a long service life;
 it is corrosion-resistant;
 it can be inserted in the available installation space;
 it can be encapsulated by the injection molding of plastic;
 it can be retrofitted;
 it can be replaced;
 it can be manufactured inexpensively;
 it can be attached to the brake simply; and
 it can be assembled simply in series production and onsite in the event of a replacement or retrofitting.

Further advantageous configurations of the invention are described and claimed herein.

Other objects, advantages and novel features of the present invention will become apparent from the following detailed description of the invention when considered in conjunction with the accompanying drawings.

DETAILED DESCRIPTION OF THE DRAWINGS

Figure 1:
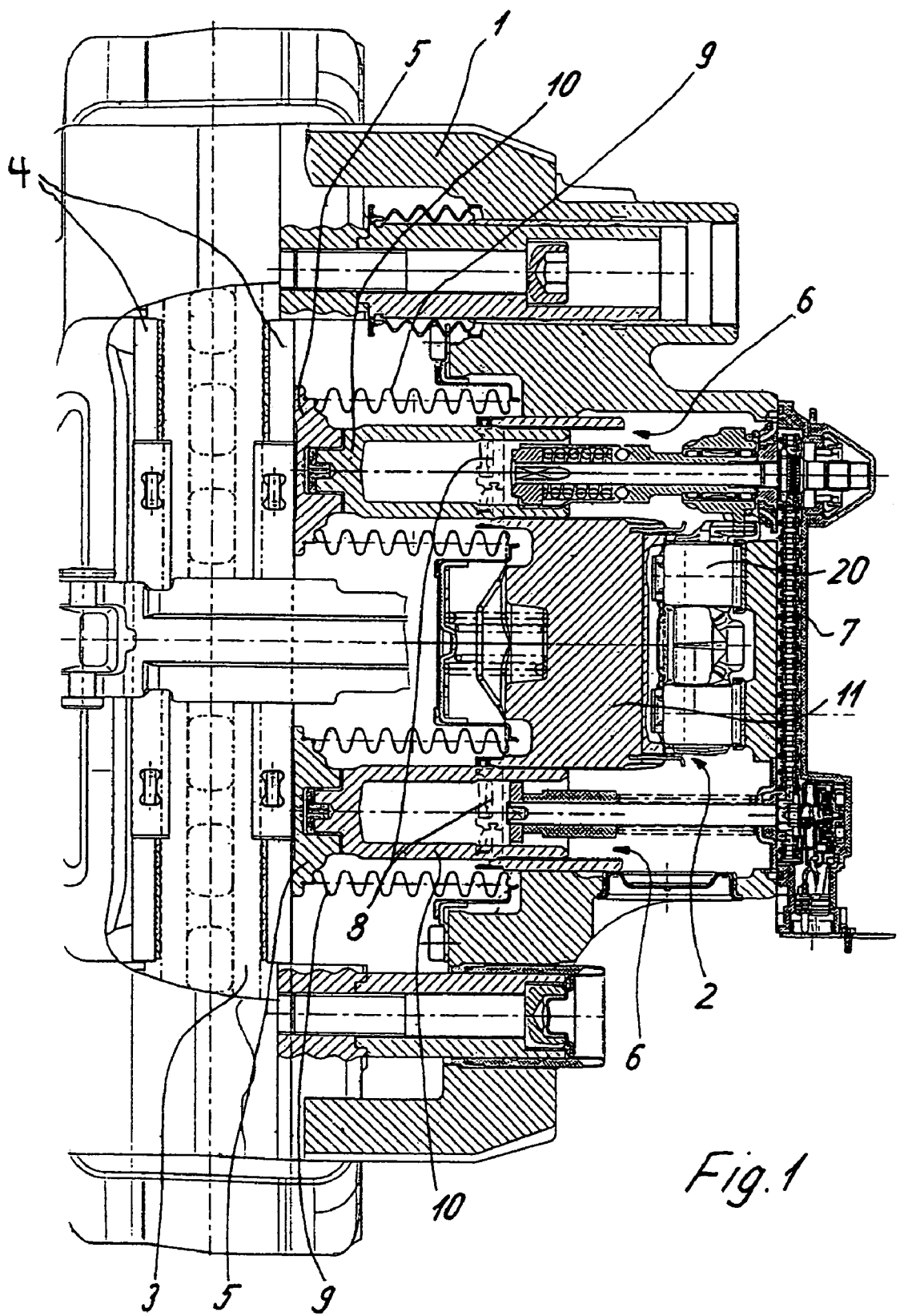
FIG. 1 shows a disc brake according to the invention, in a partially sectioned plan view.

FIG. 1 shows a pneumatically operable disc brake, which has a brake caliper 1 configured as a sliding caliper and which surrounds a brake disc 3 in its upper circumferential region.

In principle, an electromotive actuation of the disc brake may be employed. Furthermore, the invention is also suitable in principle for disc brakes with fixed or pivoting calipers.

Brake linings 4 are arranged on both sides of the brake disc 3. Here, a brake application device 2 serves to operate the disc brake by applying the brake linings against the brake disc. The precise function of the brake application device 2 is described in greater detail in DE 94 22 342.

The brake application device has a rotary lever, which acts on a crossmember 11 directly or via an intermediate element, such as a rotational bearing. The crossmember 11 is provided with threaded holes into which adjusting spindles 10 are screwed.

In order to adjust the "play" which is increased by braking operations causing wear of the linings, one of the adjusting spindles is assigned an adjusting device 6, by which the play or gap which changes as a consequence of lining wear is adjusted by rotation of the adjusting spindle 10. The second adjusting spindle 10 is driven by a synchronization device, such as a chain 7 in this case.

Figure 2:
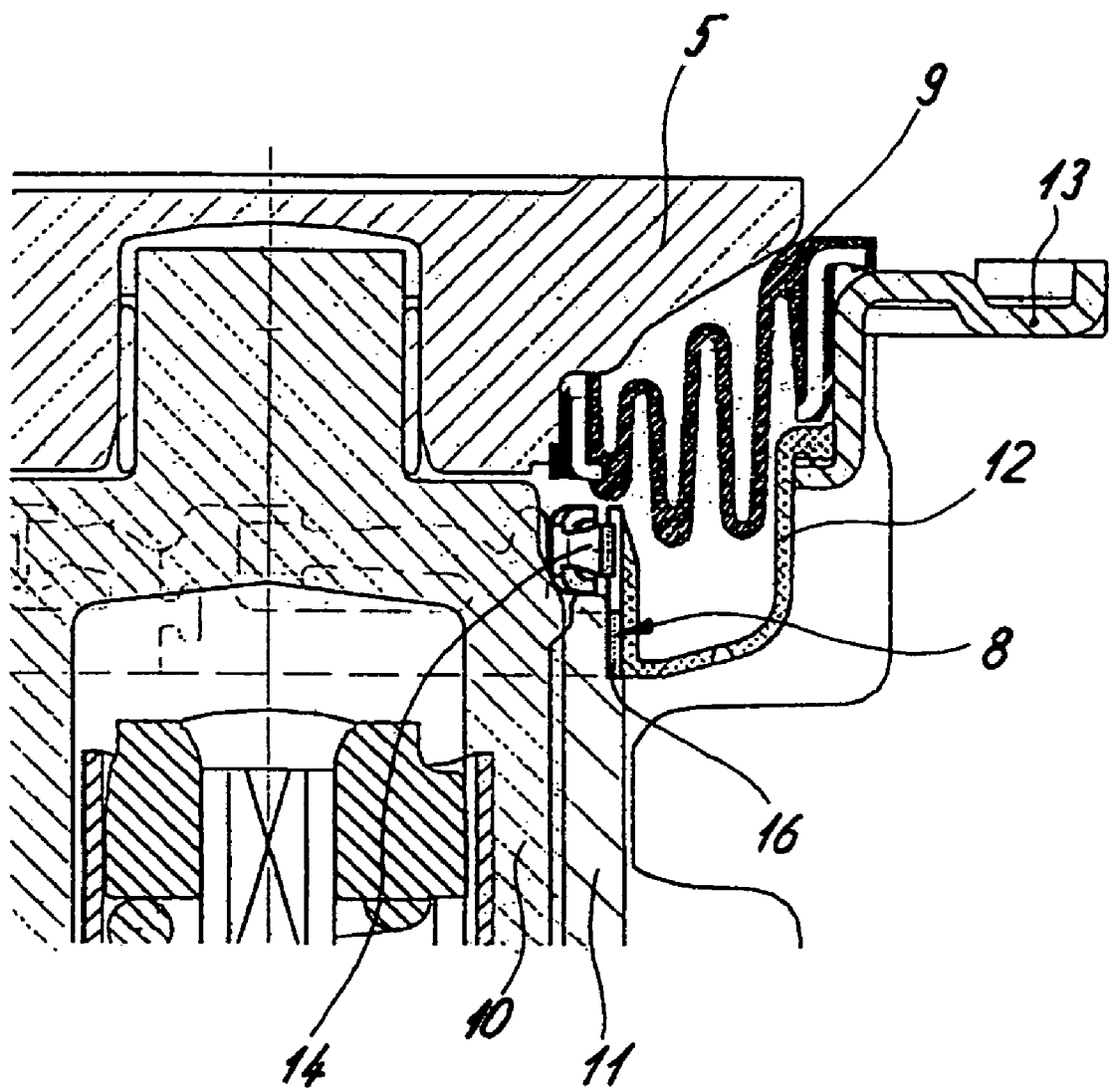
FIG. 2 shows a partial detail of the disc brake, in a sectioned plan view.
Figure 3:
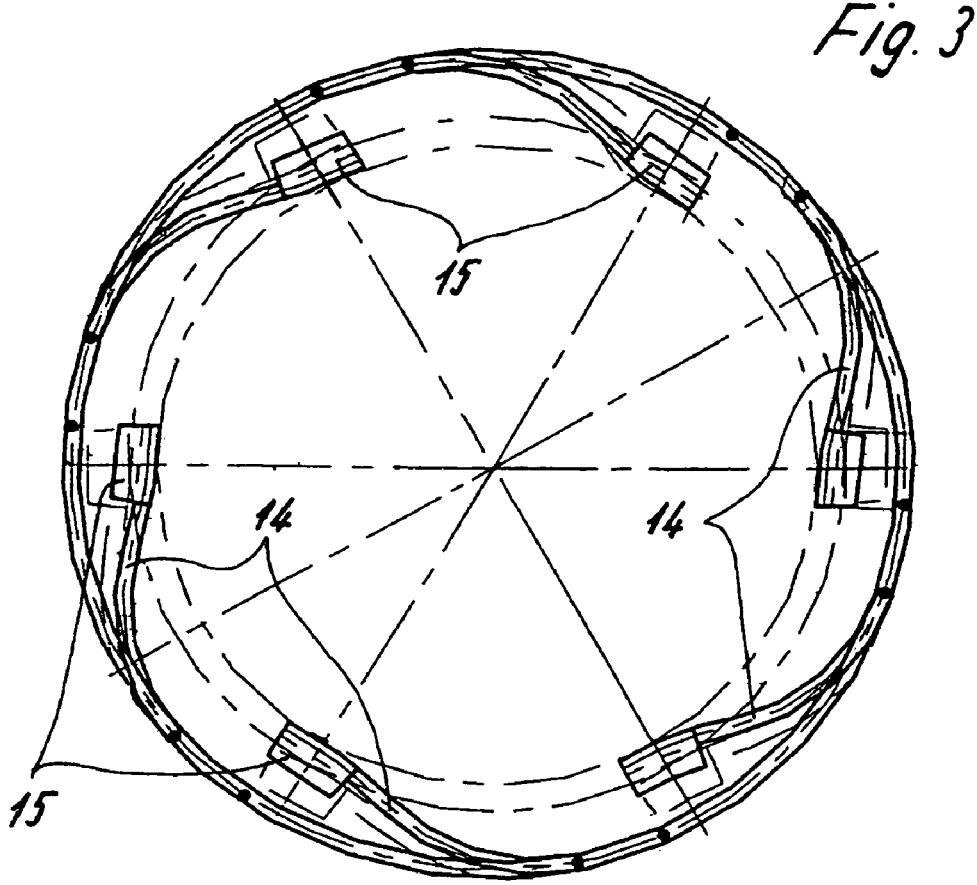
FIG. 3 shows a spring ring of the disc brake, in a plan view.

In order to prevent the adjusting spindles 10 from rotating undesirably, for example as a result of vibrations during driving operation, and the air play thus being changed accordingly in an undesired manner, every adjusting spindle 10 is assigned a securing element in the form of a spring ring 8. The securing element has a multiplicity of spring clips 14, which are distributed over the circumference and are in frictional contact with the adjusting spindle 10 outside the internal thread of the crossmember 11. This can be seen particularly clearly in FIG. 2. The spring clips 14 are integrally formed axially on the spring ring via webs 21 (See FIG. 4) or are connected to the latter and protrude inward from the spring ring 8.

Figure 4:
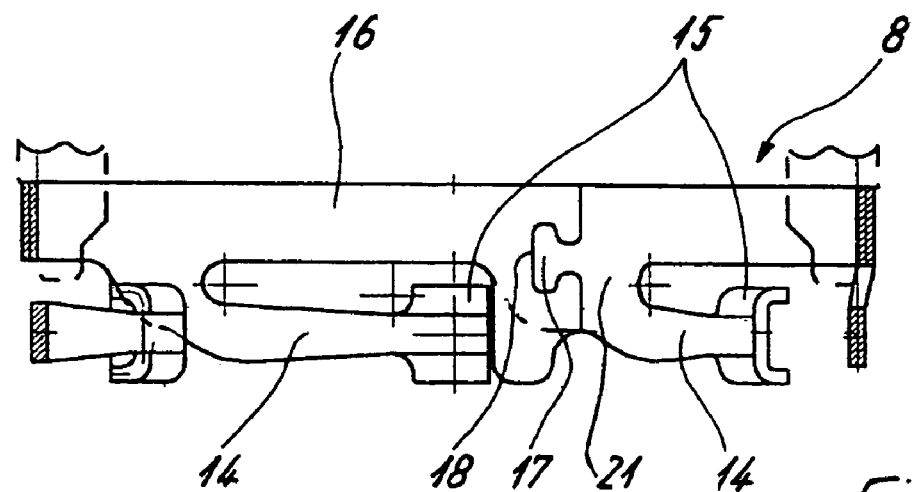
FIG. 4 shows a section through the spring ring, in a side view.

In this example, the spring ring 8 is connected to an elastic secondary seal 12, which is likewise fastened to a closure plate 13 in the same way as a folding bellows 9, which is connected to the pressure piece 5. By way of the closure plate 13, the interior of the brake caliper 1 is closed. Furthermore, it is to be seen that the spring ring 8 bears against the crossmember 11 on the outside with a closed annular region 16, while the spring clips 14, in the form of spring arms, protrude at the end radially beyond the crossmember 11 and, as mentioned, bear against the adjusting spindle 10 with contact faces 15 (FIG. 4).

Five or six spring clips 14 are preferably distributed uniformly on the circumference of the annular region 16 of the spring ring 8.

Every contact face 15 is formed by the back (or buttom) of a U-shaped portion, the leg 24 of which, facing the annular region 16, forms a stop when the spring ring 8 is pushed onto the crossmember.

Moreover, as a result of the abovementioned legs 24, the spring clips 14 can be slid onto the adjusting spindle 10 very easily from both ends while the legs 24 are being spread, which results in simple assembly and simple maintenance.

Figure 5:
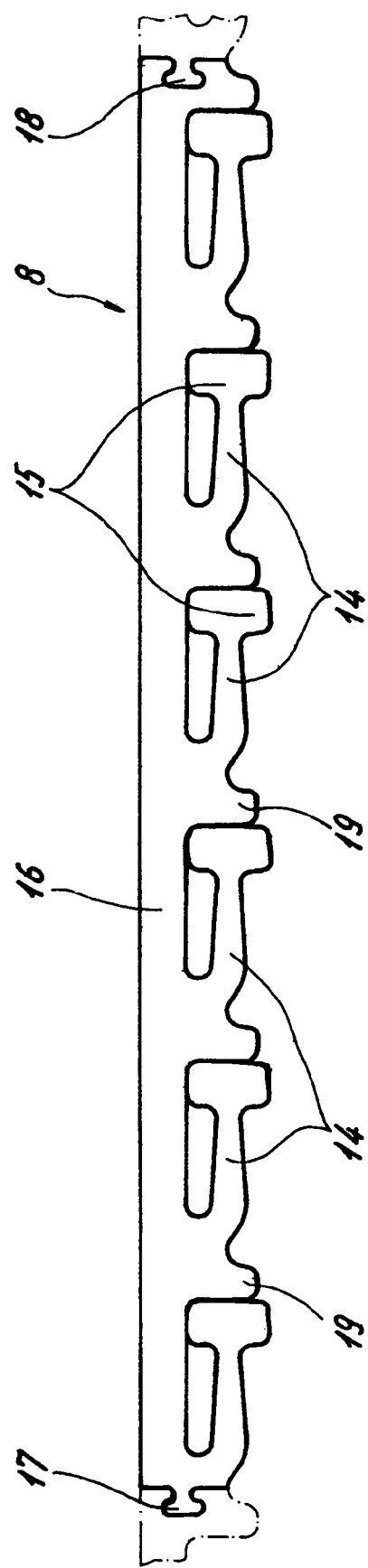
FIG. 5 shows a stamped part before deformation to form a spring ring, in a side view.

As FIG. 5 shows very clearly, the spring ring 8 may be manufactured from a strip-shaped punched part, which has a tongue 17 at one end, while the other end is configured as a groove 18, into which the tongue 17 engages correspondingly after deformation of the strip to form the spring ring 8, with the result that a form-fitting connection is attained.

In order to prevent unintended bending of the spring clips 14 in the axial direction of the spring ring, which bending is induced by assembly, lugs 19, which extend axially and protrude in height terms beyond the respectively associated spring clip 14, are provided in the connecting region of every spring clip 14 to the annular region 16, with the result that the lug 19 in practice forms a stop.

Figure 6:
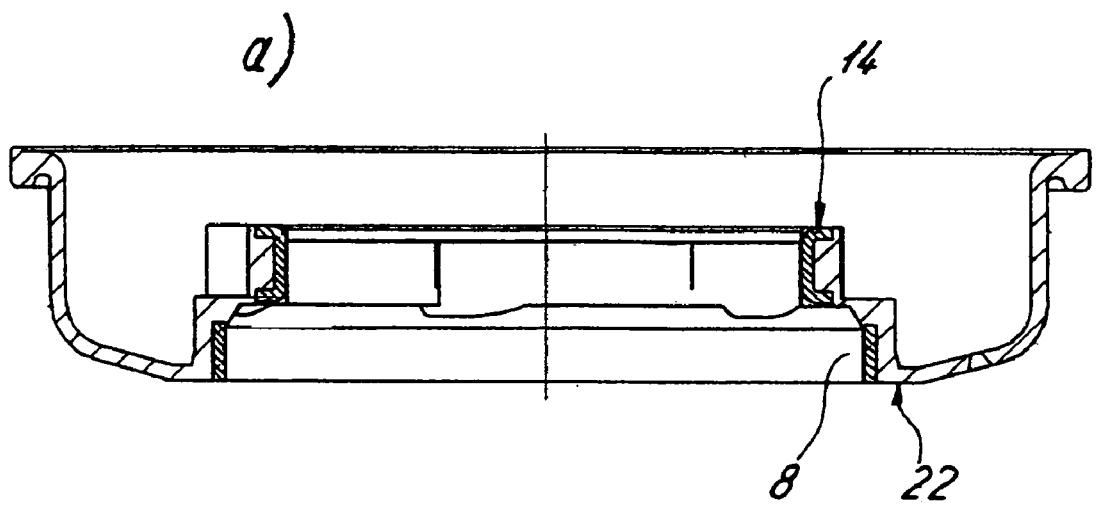
FIGS. 6a-6c show various views of a spring ring with injection molded encapsulation.
Figure 6:
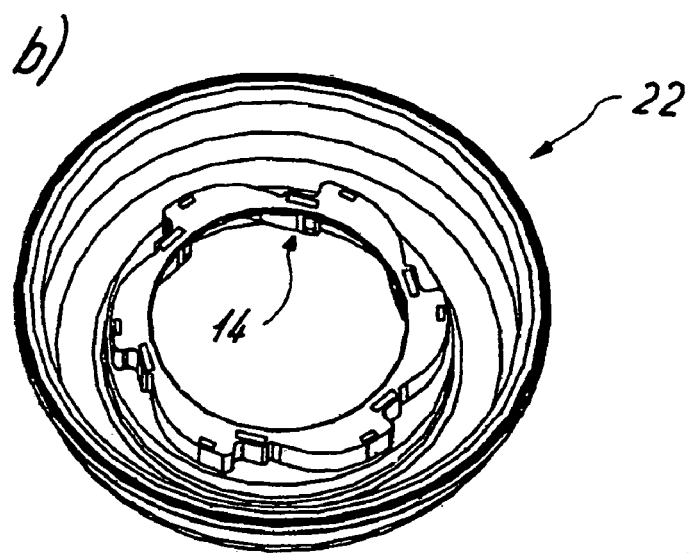
Figure 6:
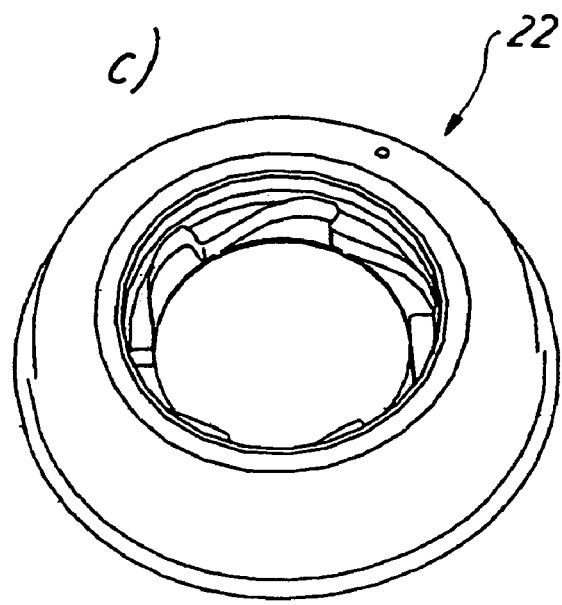

FIG. 6 shows a variant, in which the spring ring 8 is configured so as to be encapsulated partially by injection molding, preferably apart from the spring clips 14, with the result that the spring ring 8 may be combined with a type of sealing ring section 22, which protects the interior of the brake caliper in a simple way against ingress of moisture and is appropriate, in particular, in the field of retrofitting existing constructions during maintenance.

Figure 7:
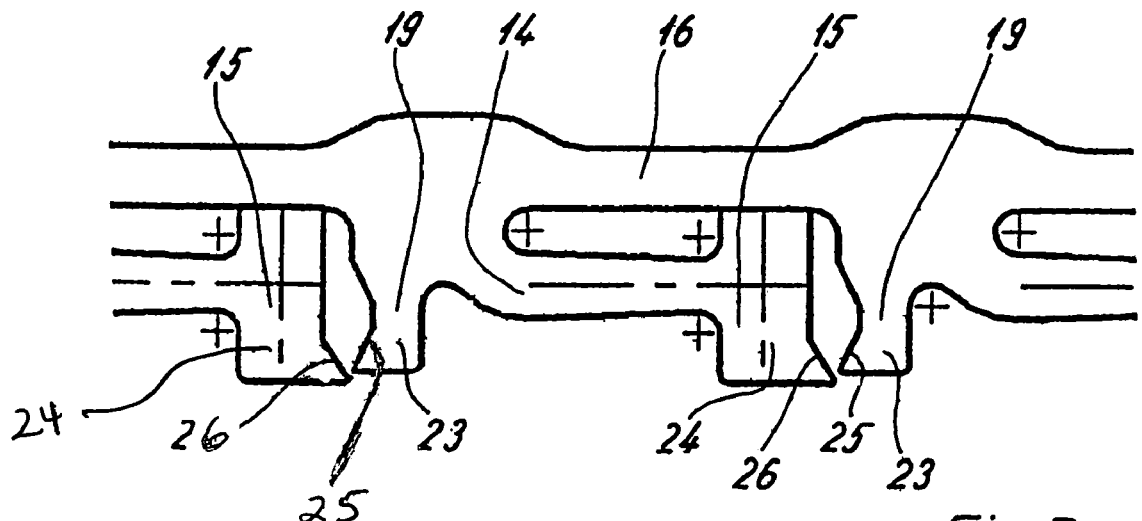
FIG. 7 shows a further exemplary embodiment of a stamped part before deformation to form a spring ring, in a side view.
Figure 8:
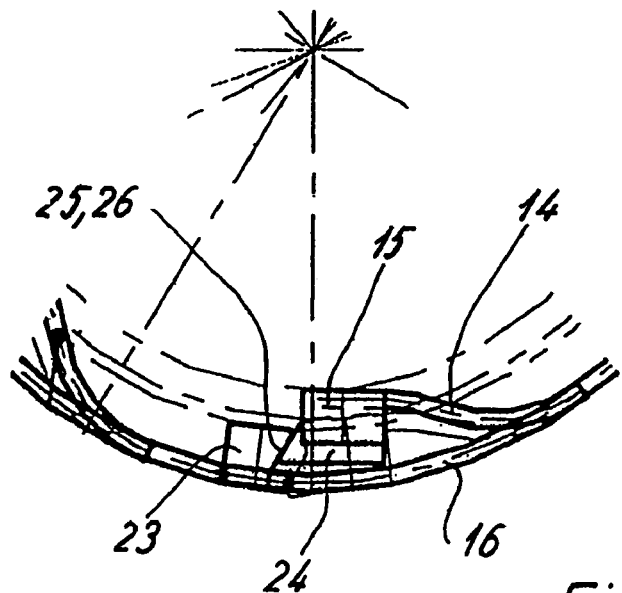
FIG. 8 shows a partial detail of the stamped part according to FIG. 7, which has been shaped to form a spring ring, in a plan view.

In order to prevent the spring rings 8, which are to be transported as bulk material, from becoming entangled with one another and thus making simple removal difficult, in each case one inclined stop 25, 26 is integrally formed, in the exemplary embodiment shown in FIGS. 7 and 8, firstly on the lug 19 and on a leg 24 which adjoins the contact face, to be precise the lower leg 24 in relation to the annular region 16. Here, the inclined stop 25 of the lug 19 is provided on a formed limb 23 which extends inward, and the inclined stop 25 bears against the associated other inclined stop 26 in the position of use (FIG. 8). There are thus no free, hook-shaped parts, which could become wedged in one another.

TABLE OF REFERENCE NUMBERS

1 Brake caliper
2 Brake application device
3 Brake disc
4 Brake lining
5 Pressure piece
6 Adjusting device
7 Synchronization device
8 Spring ring
9 Folding bellows
10 Adjusting spindle
11 Crossmember
12 Secondary seal
13 Closure plate
14 Spring clip
15 Contact face
16 Annular region
17 Tongue
18 Groove
19 Lug
20 Rotary lever
21 Webs
22 Sealing ring section
23 Limb
24 Leg
25 Inclined stop
26 Inclined stop The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pneumatically or electromotively operable disc brake, comprising:
    a brake caliper which straddles a brake disc when in use;
    at least one brake application device for applying the disc brake via a displaceably guided cross-member,
    the displaceably guided cross-member having at least one threaded hole, into which an adjusting spindle is screwed which bears a pressure piece, the pressure piece pressing a brake lining against the brake disc,
    a wear adjusting device which is operatively connected to the adjusting spindle for adjusting a play; and
    a securing element, which acts on the adjusting spindle so as to impede rotation of the adjusting spindle up to a defined torque; wherein the securing element is configured as a spring ring having a plurality of spring clips which are distributed over a circumference of the spring ring and are in frictional contact with the adjusting spindle outside an internal thread of the displaceably guided cross-member.

2. The disc brake according to claim 1, wherein the spring ring is made of metal.

3. The disc brake according to claim 2, wherein the spring ring is made of spring steel.

4. A pneumatically or electromotively operable disc brake, comprising:
    a brake caliper which straddles a brake disc when in use;
    at least one brake application device for applying the disc brake via a displaceably guided cross-member,
    the displaceably guided cross-member having at least one threaded hole, into which an adjusting spindle is screwed which bears a pressure piece, the pressure piece pressing a brake lining against the brake disc,
    a wear adjusting device which is operatively connected to the adjusting spindle for adjusting a play;
    a securing element, which acts on the adjusting spindle so as to impede rotation of the adjusting spindle up to a defined torque; wherein the securing element is configured as a spring ring having a plurality of spring clips which are distributed over a circumference of the spring ring and are in frictional contact with the adjusting spindle outside an internal thread of the displaceably guided cross-member; and wherein the spring ring has a circumferential, cylindrical annular region, which bears against the cross-member and is adjoined by the plurality of spring clips.

5. A pneumatically or electromotively operable disc brake, comprising:
a brake caliper which straddles a brake disc when in use;
at least one brake application device for applying the disc brake via a displaceably guided cross-member,
the displaceably guided cross-member having at least one threaded hole, into which an adjusting spindle is screwed which bears a pressure piece, the pressure piece pressing a brake lining against the brake disc,
a wear adjusting device which is operatively connected to the adjusting spindle for adjusting a play;
a securing element, which acts on the adjusting spindle so as to impede rotation of the adjusting spindle up to a defined torque; wherein the securing element is configured as a spring ring having a plurality of spring clips which are distributed over a circumference of the spring ring and are in frictional contact with the adjusting spindle outside an internal thread of the displaceably guided cross-member; and
wherein each of the plurality of spring clips has a contact face, which bears against the adjusting spindle.

6. The disc brake according to claim 5, wherein each of the plurality of spring clips bears against an external thread of the adjusting spindle.

7. The disc brake according to claim 5, wherein a width of the contact face is dimensioned such that said contact face bears at least against two thread crests which delimit a thread.

8. The disc brake according to claim 4, wherein each of the plurality of spring clips is configured as a spring arm which is connected to the annular region.

9. The disc brake according to claim 4, wherein between three to six spring clips are formed integrally on the annular region.

10. A pneumatically or electromotively operable disc brake, comprising:
a brake caliper which straddles a brake disc when in use;
at least one brake application device for applying the disc brake via a displaceably guided cross-member,
the displaceably guided cross-member having at least one threaded hole, into which an adjusting spindle is screwed which bears a pressure piece, the pressure piece pressing a brake lining against the brake disc,
a wear adjusting device which is operatively connected to the adjusting spindle for adjusting a play;
a securing element, which acts on the adjusting spindle so as to impede rotation of the adjusting spindle up to a defined torque; wherein the securing element is configured as a spring ring having at least one or more spring clips which are distributed over a circumference of the spring ring and are in frictional contact with the adjusting spindle outside an internal thread of the displaceably guided cross-member;
wherein each of the at least one or more spring clips has a contact face, which bears against the adjusting spindle; and
wherein the contact face is formed by a bottom of a U-shaped free end of each spring clip.

11. A pneumatically or electromotively operable disc brake, comprising:
a brake caliper which straddles a brake disc when in use;
at least one brake application device for applying the disc brake via a displaceably guided cross-member,
the displaceably guided cross-member having at least one threaded hole, into which an adjusting spindle is screwed which bears a pressure piece, the pressure piece pressing a brake lining against the brake disc,
a wear adjusting device which is operatively connected to the adjusting spindle for adjusting a play;
a securing element, which acts on the adjusting spindle so as to impede rotation of the adjusting spindle up to a defined torque; wherein the securing element is configured as a spring ring having a plurality of spring clips which are distributed over a circumference of the spring ring and are in frictional contact with the adjusting spindle outside an internal thread of the displaceably guided cross-member; and
wherein the spring ring is designed in an integrated manner with a seal.

12. The disc brake according to claim 5, wherein the spring ring is configured so as to be surrounded at least partially by at least one of injection-molded and foamed encapsulation.

13. The disc brake according to claim 10, wherein in a connecting region of each spring clip to an annular region, a lug is formed integrally, which lug extends axially away from the annular region and protrudes beyond the spring clip.

14. The disc brake according to claim 5, wherein the spring ring is formed from a strip as a punched part.

15. A pneumatically or electromotively operable disc brake, comprising:
a brake caliper which straddles a brake disc when in use;
at least one brake application device for applying the disc brake via a displaceably guided cross-member,
the displaceably guided cross-member having at least one threaded hole, into which an adjusting spindle is screwed which bears a pressure piece, the pressure piece pressing a brake lining against the brake disc,
a wear adjusting device which is operatively connected to the adjusting spindle for adjusting a play;
a securing element, which acts on the adjusting spindle so as to impede rotation of the adjusting spindle up to a defined torque: wherein the securing element is configured as a spring ring having at least one or more spring clips which are distributed over a circumference of the spring ring and are in frictional contact with the adjusting spindle outside an internal thread of the displaceably guided cross-member;
wherein each of the at least one or more spring clips has a contact face, which bears against the adjusting spindle;
wherein the spring ring is formed from a strip as a punched part; and
wherein each of the two ends of the strip is provided with closure device which, after deformation, engage into one another with a form-fitting connection to form the spring ring.

16. The disc brake according to claim 15, wherein the closure device comprises a tongue and a groove coupling.

17. The disc brake according to claim 13, wherein a leg which adjoins that side of the contact face which faces away from the annular region bears against a limb which is formed integrally on the lug.

18. The disc brake according to claim 17, wherein the limb and the leg each have an inclined stop which lie against one another.

19. The disc brake according to claim 18, wherein the limb extends such that it is directed toward a center of the spring ring.

20. A brake application device for use with a pneumatic or electromotively operable disc brake, the brake application device comprising:

a cross-member displaceable toward a brake disc when in use, the cross member including at least one threaded bore;

an adjusting spindle which threads into the threaded bore, the adjusting spindle bearing a pressure piece at an end of the adjusting spindle which extends beyond the cross-member;

a spring ring configured to act on a portion of the adjusting spindle that extends outside of the cross-member in order to impede rotation of the adjusting spindle up to a defined torque, the spring ring having a plurality of spring clips distributed about a circumference thereof, the at least one or more spring clips being in frictional contact with the adjusting spindle at the portion of the adjusting spindle extending outside of the cross-member.

21. The brake application device according to claim 20, wherein the spring ring is made of spring steel.

22. The brake application device according to claim 21, wherein the spring ring includes a substantially cylindrical annular region, an inner surface thereof bearing against a corresponding outer surface of the cross member, the at least one or more spring clips extending from the substantially cylindrical annular region.

23. The brake application device according to claim 22, wherein each of the plurality of spring clips includes a contact face that bears against an external thread of the adjusting spindle.

24. The brake application device according to claim 23, wherein the contact face bears against at least two thread crests delimiting a thread trough on the adjusting spindle.

25. A disc brake component operatively configured to impede rotation of an adjusting spindle threaded into a cross-member of a brake application device for a pneumatic or electromotively operated disc brake, the component comprising:

a spring ring securing element operatively sized for use in the disc brake and made of spring steel, wherein the spring ring includes:

a substantially cylindrical annular region operatively configured such that an interior surface thereof is bearable against a corresponding outer surface of the cross-member when installed;

a plurality of spring clips distributed about a circumference of the spring ring, the spring clips adjoining the substantially cylindrical annular region; and wherein the spring clips are operatively configured to be in friction contact with the adjusting spindle in a region outside of the cross-member when installed.

26. The securing element according to claim 25, wherein each of the spring clips have a contact face, a width of the contact face being dimensioned so as to bear against at least two thread crests delimiting a thread trough on the adjusting spindle.

* * * * *